(12) United States Patent
Belser (10) Patent No.: US 6,278,667 B1
(45) Date of Patent: Aug. 21, 2001

(54) SYSTEM AND METHOD FOR LIGHT POWER CONTROL IN A MAGNETO-OPTICAL DRIVE

(75) Inventor: Karl A. Belser, San Jose, CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/192,551

(22) Filed: Nov. 13, 1998

Related U.S. Application Data (60) Provisional application No. 60/073,272, filed on Jan. 30, 1998.

(51) Int. Cl.[7] .................................................. G11B 11/00
(52) U.S. Cl. .............................................. 369/13; 369/116
(58) Field of Search ............................... 369/13, 14, 110, 369/116; 300/59, 114; 365/122

(56) References Cited

U.S. PATENT DOCUMENTS

| | | | |
|---|---|---|---|
| 4,937,799 | * | 6/1990 | Hashimoto et al. . |
| 5,182,734 | * | 1/1993 | Watanabe et al. . |
| 5,218,591 | * | 6/1993 | Shimamoto et al. . |
| 5,247,509 | * | 9/1993 | Nakane et al. . |
| 5,327,414 | * | 7/1994 | Makino . |
| 5,329,512 | * | 7/1994 | Fukimoto et al. . |
| 5,335,213 | * | 8/1994 | Fukumoto et al. . |
| 5,367,509 | * | 11/1994 | Fukumoto et al. ................. 369/13 |
| 5,390,162 | * | 2/1995 | Fukumoto et al. . |
| 5,469,413 | * | 11/1995 | Kagawa . |
| 5,477,528 | * | 12/1995 | Murakami et al. ............... 369/275.4 |
| 5,513,165 | * | 4/1996 | Ide et al. . |
| 5,537,383 | * | 7/1996 | Gage et al. . |
| 5,579,294 | * | 11/1996 | Ohta et al. . |
| 5,617,400 | * | 4/1997 | Fuji ..................................... 369/116 |

\* cited by examiner

*Primary Examiner*—Tan Dinh
(74) *Attorney, Agent, or Firm*—Edward P. Heller, III; Raghunath S. Minisandran

(57) ABSTRACT

A method and system for monitoring in real-time changes in operating conditions such as temperature of a magnetic super resolution magneto-optical system which produce variations in aperture size in the media readout layer. The magnitude of a magneto-optical (MO) amplitude signal in a reflected laser beam is monitored, normalized by dividing by the laser power, compared to the amplitudes in a table of stored values, and used to derive a laser power feedback signal for controlling the power of the laser to maintain a predetermined aperture size. The MO amplitude signal is derived from patterns representing calibration tones prerecorded onto portions of the data tracks of the MSR media.

1 Claim, 8 Drawing Sheets

SYSTEM AND METHOD FOR LIGHT POWER CONTROL IN A MAGNETO-OPTICAL DRIVE

This application claims benefit of Provisional Appl. 60/073,272 filed Jan. 30, 1998.

BACKGROUND OF THE INVENTION

This invention relates generally to the control of light power in an optical storage system, and in particular to a system and method for controlling laser power in a magnetic super-resolution magneto-optical storage system.

Data storage systems may store digital data using a plurality of different storage media. These include magnetic media, optical media, and magneto-optical (MO) media. Magneto-optical (MO) storage systems are advantageous in that the MO media may be written and rewritten multiple times and read using laser light. Data is written onto MO media in a magneto-optical storage system by impinging the laser light onto the MO medium at a power level that is sufficient to heat the MO medium to a predetermined temperature known as the Curie temperature, and a magnetic field is applied to the MO medium such that magnetic dipoles within the particular heated region of the medium align with the externally applied magnetic field with a polarity determined by the direction of the applied field. Depending upon the direction of the applied magnetic field, the magnetic dipoles in the region will store a magnetic representation of a binary "1" or a binary "0". Subsequently, data is read by impinging an incident laser light beam having a predetermined polarization onto the MO medium. The polarization of the light beam reflected from the MO medium is rotated relative to the polarization of the incident laser light either clockwise or counterclockwise from the incident polarization due to the direction of magnetization of the particular magnetic region from which the beam is reflected. This is known as the Kerr effect, and the reflected beam can be processed by an optical detection system to read the data stored in the illuminated region of the MO medium.

In order to accurately read or write data onto and from MO media, the power of the laser light that impinges on the MO media should be controlled. Too much laser power may damage the media, while too little power may not heat the media sufficiently to permit magnetic dipoles to be altered. The appropriate amount of laser power required for reading and writing data onto the MO media depends upon the media temperature, and is influenced by a number of factors such as media physical characteristics and operating conditions. These include the speed of rotation of the media, the temperature change of the media during operation, variations in media sensitivity with radius, and changes in recording and writing efficiency of the MO storage system. It is desirable to compensate for such factors in real time by determining the appropriate laser power level and controlling the laser power for different operating conditions.

In some MO storage systems that use a conventional MO storage medium, the continuous laser power can be adjusted according to the speed of rotation of the medium to write or erase a data track of a constant radial width. For a given power, it is known that the temperature of the storage medium will vary non-linearly with the rotational velocity of the medium. In such systems, the laser power is typically adjusted based upon the calculated or measured changes in the velocity of the storage media. The shortcoming of this approach is that it is not based on actual measurements of the medium itself, and it does not take into consideration factors other than velocity which influence the temperature of the storage medium.

Some MO media are formed on a metal substrate which has good thermal conductivity so that changes in the media temperature are more predictable. Changing laser power based only the rotational speed of the storage media may possibly be an acceptable approach for controlling laser power with such media. However, in order to reduce the overall costs of the MO media and the MO storage system, it is common to use less costly plastic substrates for the MO media. As compared to metal substrates, plastic substrates have poor thermal conductivity characteristics so that the temperature of the plastic media may experience greater fluctuations in temperature as portions of the media are heated. For this type of media, controlling laser power only as a function of media rotational speed does not consider ambient media temperature at the time of writing or reading and is not acceptable.

Moreover, a new type of MO media referred to as magnetic super resolution (MSR) storage media has been developed for use in magneto-optical storage systems. It utilizes an upper magnetic readout layer and a lower buried magnetic storage layer. The buried storage layer may be a conventional MO medium that is not accessible for reading until the upper readout layer is heated sufficiently with laser light to reach a predetermined read temperature at which an "aperture" is formed through which the buried layer can be viewed. This aperture enables the magnetic flux in the storage layer to be copied to the readout layer and be visible at the media surface.

With MSR storage media, the laser power applied to the MSR media during a read operation determines the temperature profile in the readout layer, and thus the aperture size. The power should be carefully controlled so that the aperture is maintained with a constant size which is independent of operating conditions such as media velocity and ambient media temperature. If the aperture is smaller than the magnetic region in the buried storage layer beneath it, the magnetic flux coupled to the upper readout layer may be insufficient to generate an adequate signal for readout. If the aperture is too large, the light will be reflected from adjacent magnetic regions and may be degraded because of intersymbol interference. The laser power applied to the MSR media should also be controlled during a write operation since the written magnetic region should be wide enough so that it is readable during a read operation if the incident laser light is slightly off-track. The laser power during writing of data should also be controlled so that adjacent regions are not inadvertently overwritten. The appropriate laser power for a reading or writing is determined by the temperature of the media, which is a function of a number of different factors and may vary substantially in real time. Controlling laser power on the basis of rotational velocity of the storage media, fails to take into consideration the actual time-varying operating conditions of the media and does not control laser power appropriately to actual conditions. Thus, some systems attempt to monitor the temperature of the storage media using temperature sensors adjacent the media, and control laser power in response to sensed changes in media temperature. However, accurately measuring the temperature of a rotating medium using temperature sensor is very difficult, particularly at the point of the read/write head.

Thus, there's a need for a system and method that affords real-time control of laser power for reading and writing of data in a magneto-optical storage system that utilizes MSR storage media, and which avoids the foregoing and other problems of known systems and methods. It is to these ends that the present invention is directed.

SUMMARY OF THE INVENTION

The invention affords a system and method which enable the actual operating conditions of a magneto-optical MSR storage medium to be monitored in real-time, and the laser power to be controlled in response to the measured operating conditions to insure optimum power for reading and writing of stored data.

In accordance with one aspect, the invention provides system and method for controlling laser power in a magneto-optical storage system in which laser light which is reflected from the magneto-optical medium is received and a signal representative of a characteristic of the reflected light is generated and used for controlling the laser power to cause a signal to assume a predetermined value.

The characteristic of the reflected light may be an amplitude value which is derived from the polarization of the reflected light. The amplitude is related to the temperature of the magneto-optical medium in the region illuminated by the laser beam, and the value of the signal is representative of the temperature of the medium. The laser power is controlled to provide a predetermined temperature by using the signal amplitude.

In accordance with another aspect, the invention reads a pre-recorded pattern defining a tone from the MSR storage media using a reflected light beam, monitors the magnitude of the tone in real-time, and adjusts the incident laser power impinging on the media to achieve a predetermined magnitude. The predetermined magnitude is selected to correspond to an optimum aperture size in a readout layer of the MSR medium, and the laser power is adjusted to produce a temperature in the readout layer appropriate to the desired aperture size.

In another aspect, the invention controls the power of the laser during a write operation by controlling the write power relative to a nominal preset write power according to the variation in laser read power from a predetermined optimum read power.

DESCRIPTION OF PREFERRED EMBODIMENTS

The invention is particularly applicable to a system and method for controlling the laser power of a magneto-optical storage system that employs a magnetic super resolution (MSR) storage medium, and will be described in that context. It will be appreciated, however, that this is illustrative of only one utility of the invention.

Figure 1:
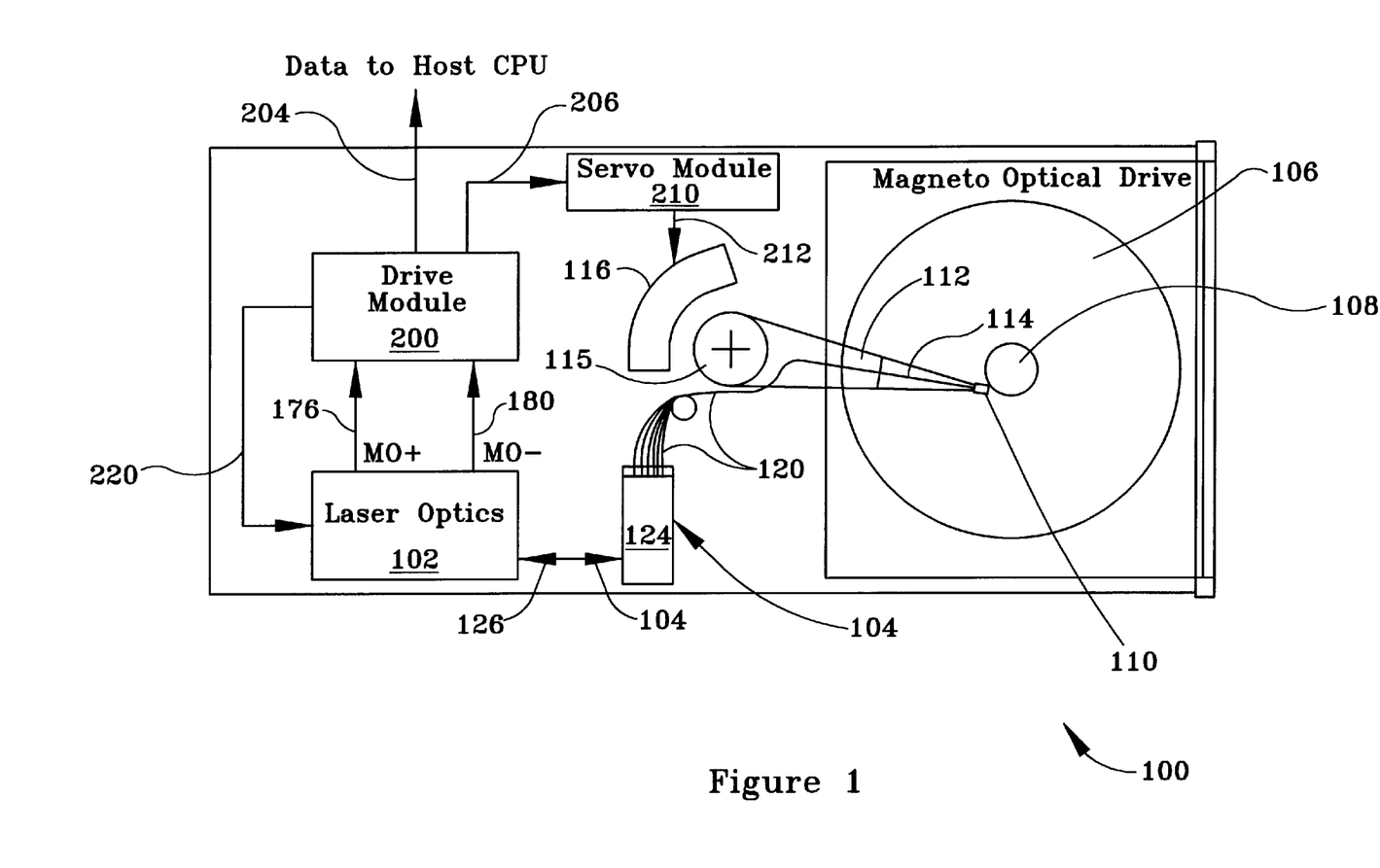
FIG. 1 is a diagrammatic view of a magneto-optical (MO) storage system in accordance with the invention.

FIG. 1 illustrates a magneto-optical (MO) drive, i.e., storage, system 100 in accordance with the invention. The storage system includes a laser optics assembly 102 (illustrated in more detail in FIG. 2) that generates and outputs a polarized laser beam 104 which is used for reading and writing of data onto a magnetic super resolution (MSR) storage medium 106. As illustrated in FIG. 1, medium 106 may comprise a disk or platter rotated about a spindle 108 by a drive motor (not shown). A flying magneto-optical head 110 is disposed on the end of an actuator arm 112 by a suspension system 114, and the head is positioned over the media 106 by rotation of the actuator arm about a pivot 115 by an actuator device 116. The actuator positions the MO head over the rotating MO medium 106 in a manner similar to a conventional Winchester-type magnetic storage drive to read or write data from the medium. The MO storage medium 106 may be a double-sided storage media, and the MO drive may comprise a plurality of rotating platters of MO media, each storage medium (side) with an associated MO head and actuator arm.

For reading and writing of medium 106, the laser beam 104 from the laser optics assembly 102 is transmitted to the MO head 110 by an optical fiber 120. Optical fiber 120 may be one of a plurality of optical fibers 122, one for each MO head of the MO drive, and the laser beam 104 may be switched by an optical switch 124 to the different heads of the storage system. As will be described in more detail shortly, data is read from the MO storage medium by detecting the polarization of the reflected laser beam 126, which is conveyed to the laser optics assembly 102 from the appropriate one of the heads by the associated optical fiber 120 and the optical switch 124. The optical fibers are preferably single-mode polarization maintaining (PM) optical fibers.

Figure 2:
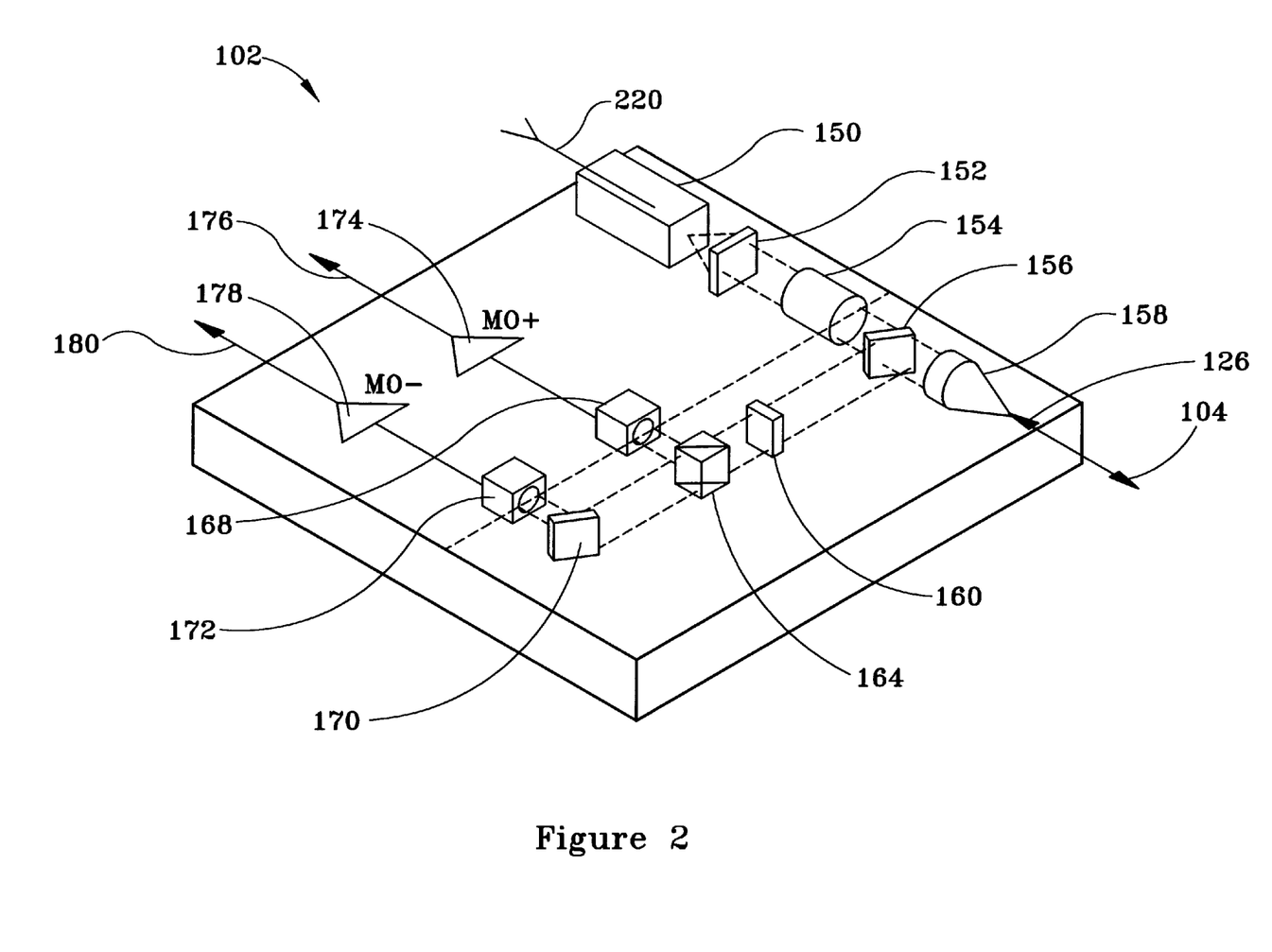
FIG. 2 is a diagrammatic view of a laser optics assembly of the system of FIG. 1.

FIG. 2 illustrates in more detail the laser optics assembly 102 of the MO storage system of FIG. 1. As shown, the laser optics assembly may comprise a diode laser 150 which generates a laser beam. The beam is passed through a series of optical elements including a half-wave plate 152, collimating optics 154 and a leaky beam splitter 156. From the leaky beam splitter the laser beam is focused by a lens 158 to produce the single-mode polarized light beam 104 which is output to the optical switch 124 and supplied as the incident laser beam via optical fiber 120 and head 110 to MO media 106. The reflected beam from the MO media is passed back through the optical fiber and switch to the laser optics assembly as reflected beam 126. The reflected beam passes through lens 158 to the leaky beam splitter 156. Thereafter, the reflected beam is passed through a half-wave plate 160 to a first polarizing beam splitter 164. The polarizing beam splitter discriminates between the positive and negative planes of polarization in the reflected laser beam. It transmits the positive plane of polarization to a first photo detector 168. The negative plane of polarization of the reflected beam is transmitted from the polarizing beam splitter 164 to a reflector 170 and to a second photo detector 172. The first photo detector 168 converts the positive plane of polarization of the reflected laser beam into an analog voltage which is amplified by a preamplifier 174 and output on a line 176 as a MO+ signal having an amplitude which is proportional to the amplitude of the positive plane of polarization in the reflected laser beam. Similarly, the second photodetector 172 converts the negative plane of polarization of the reflected beam to another analog voltage which is amplified by another preamplifier 178 to produce a MO− amplitude signal which is output on line 180.

As shown in FIG. 1, the MO+ and the MO− amplitude signals are supplied to a drive module 200 which, as will be described, controls certain functions of the MO storage system. The drive module outputs data on a line 204 to a host CPU (not shown) and outputs a control signal on another line 206 to a servo module 210. The servo module provides an output signal on a line 212 to drive actuator 116 for controlling the actuator in a manner which will be described.

As will also be described in more detail shortly, the drive module 200 processes the MO+ and MO− signals to provide a real-time assessment of the operating conditions of MO media 106. In particular, the MO+ and MO− signals enable the operating temperature of the MO media 106 to be measured at the precise location where it is being read, and to be monitored in real-time. The drive module utilizes these to adjust the laser power to compensate for changes to optimize read and write operations. The drive module processes the MO+ and MO− signals to produce a laser power control signal which is fed back on a line 220 to the laser optics assembly 102. This control signal is used to control the output power of the diode laser 150 and, in turn, the power in the incident light beam supplied to the MO media.

Figure 3:
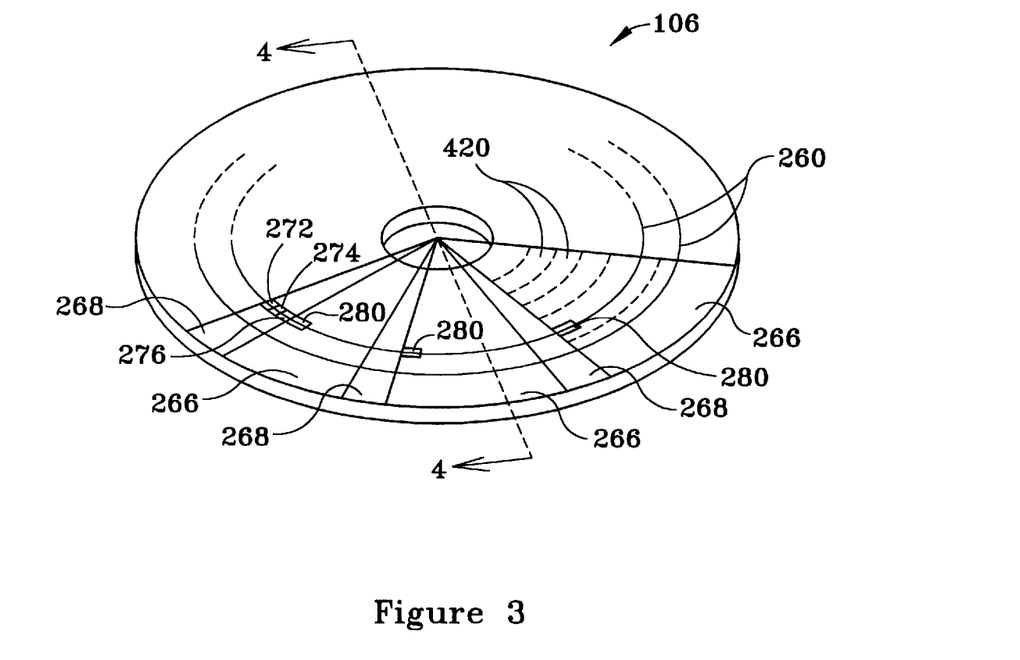
FIG. 3 is a perspective diagrammatic view of a double-sided magnetic super resolution (MSR) MO storage medium with which the invention may be employed.
Figure 4:
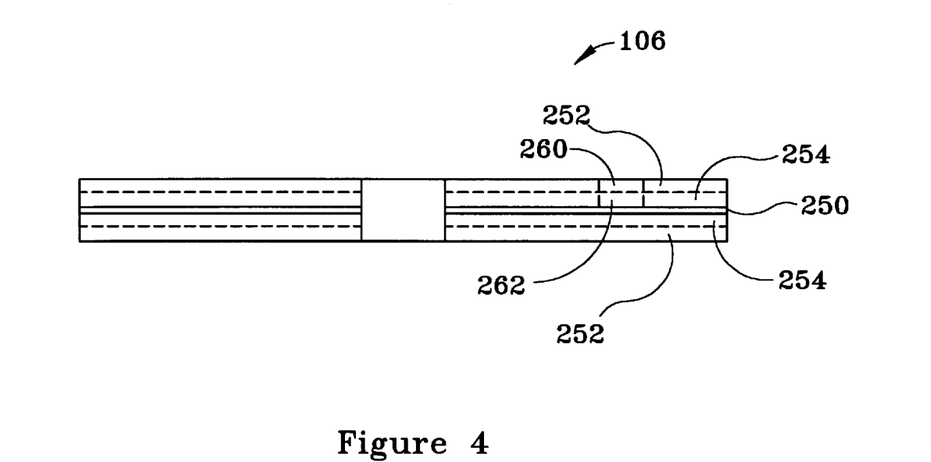
FIG. 4 is a cross-sectional view of the double-sided MSR MO storage medium of FIG. 3.

FIG. 3 is a top perspective view of the double-sided magnetic super resolution (MSR) MO storage media 106 of the invention, and FIG. 4 is a cross-sectional view of the media taken along the lines 4—4 of FIG. 3. As shown, the MSR MO media 106 is a multi-layered storage media and may comprise substantially identical structures formed as mirror images on the top and bottom sides of a substrate 250. Each media may comprise an upper readout layer 252 and a lower buried storage media layer 254 formed on substrate 250. The MSR media 106 may be formatted to have a plurality of concentric circular tracks 260 at different radii which span a plurality of data wedges (sectors) 266 and a plurality of adjacent servo sectors 268. The servo sectors have a substantially narrower width than the data wedges 266. In accordance with the invention, a portion of the data track 260 which passes through each of the servo sectors 268 may be pre-stamped with a plurality of pits 262 (only one being shown in FIG. 4). The stamped pits form a servo timing mark (STM) field 272, a sector and track address field 274, and a fine positioning field 276, the purpose and utility of which is known to those skilled in the art. As seen in the cross-sectional view of FIG. 4, the portion of one of the tracks 260 which passes through a data wedge 266 includes a portion of both the readout layer 252 and the portion of the storage layer 254. As will be described below, a track 260 that traverses a data wedge 266 may comprise a variable frequency oscillator (VFO) segment 280. The VFO segments may store patterns corresponding to predetermined spatial frequencies, and are used for the real-time monitoring of the operating conditions of the storage system and the MSR media 106, as will be described shortly.

Figure 5A:
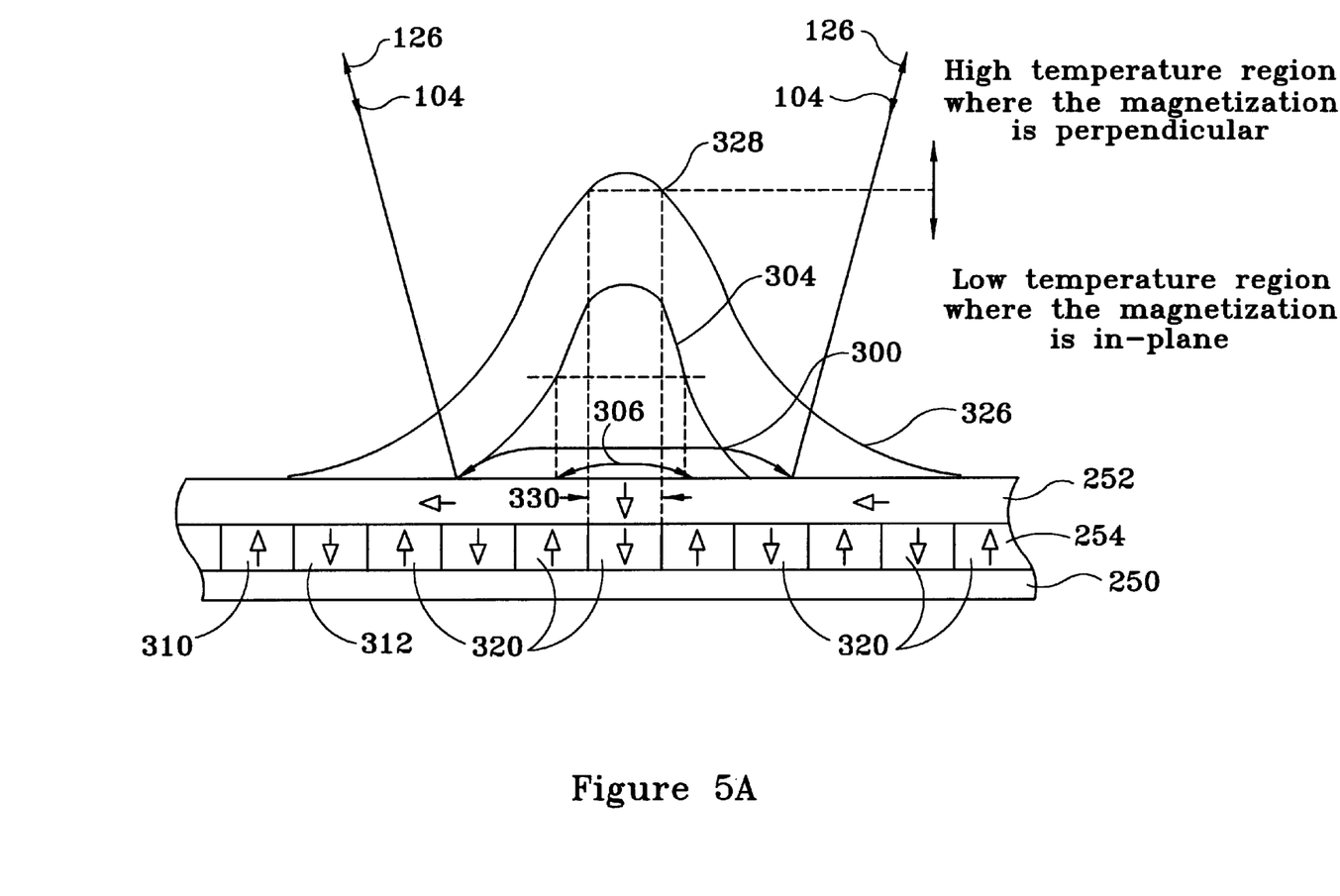
FIGS. 5A and 5B are diagrammatic views respectively illustrating the relationships between temperature and readout area in the MSR MO storage media, and for the storage of data in magnetic regions on the MSR media.
Figure 5B:
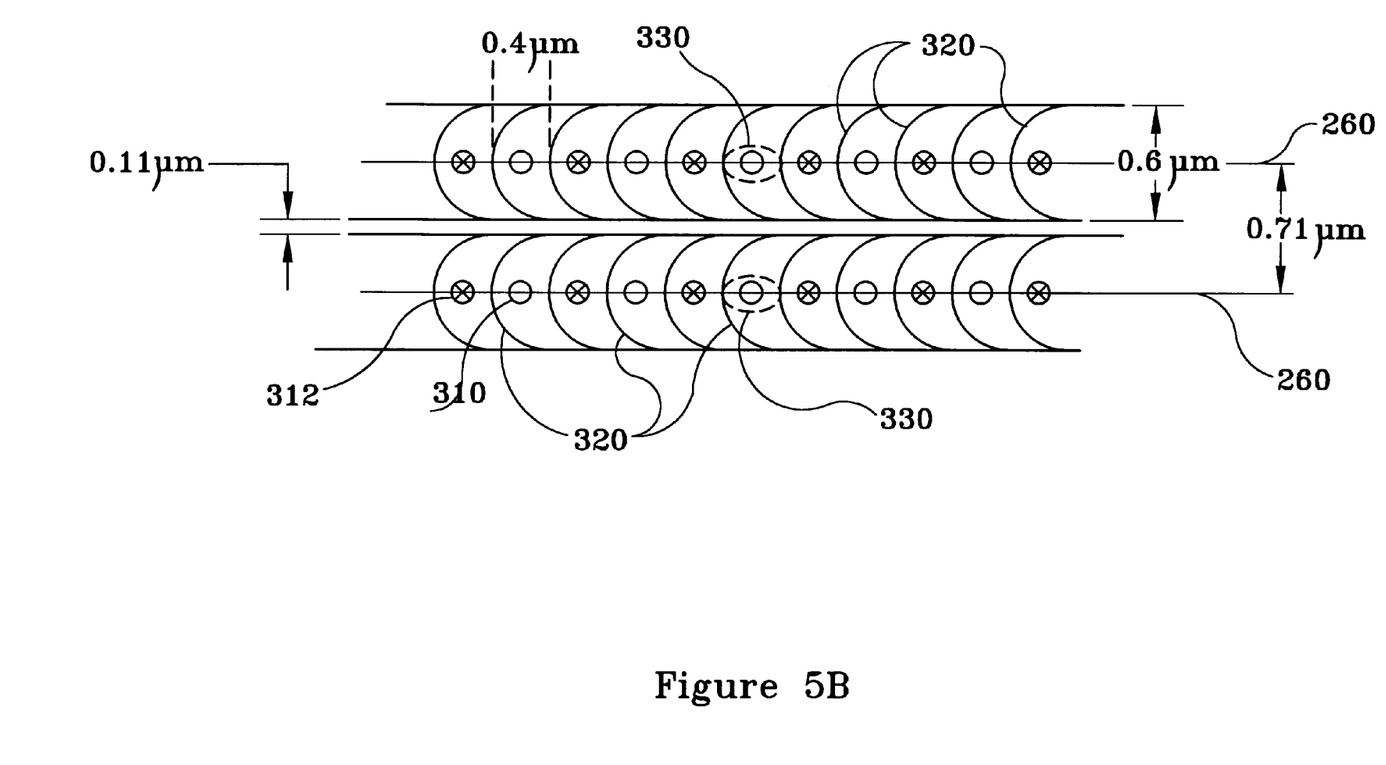

FIGS. 5A and 5B are enlarged diagrammatic views which illustrate the reading and writing of the MSR storage media 106 by the laser beam. As shown, the polarized incident laser beam 104, which is delivered to the MSR media by the optical head 110, is directed onto one of the data tracks 260 of the media. During writing of information to the data tracks of a data wedge 266, the incident laser beam is directed towards the readout layer 252 as an optical spot 300. The power in the incident beam heats the lower storage layer 254 to a first temperature preferably near its Curie temperature. FIG. 5A illustrates a typical intensity profile 304 of the laser spot at its full width half maximum (FWHM) diameter 306. Preferably, the FWHM diameter is selected to have a predetermined size, e.g., of approximately 0.6 micrometers ($\mu$m). During writing, information is embodied in an externally applied magnetic field which switches the magnetization direction 310, 312 of a magnetic region 320 either up or down to represent a binary "1" or a binary "0". In the preferred embodiment, the external magnetic field is applied using a magnetic field modulation (MFM) techniques, which are well known in the art, such that successive magnetic regions 320 overlap each other to form crescent shaped patterns as shown in FIG. 5B.

For writing, the power level of the incident laser beam 104 is adjusted to write the magnetic regions 320 with a predetermined cross-track width (the radial dimension transverse to the circular track) preferably of the order of 0.6 $\mu$m, i.e., write wide. Depending upon the modulation frequency of the magnetic field, the in-track width is preferably approximately between 0.23 $\mu$m and 0.46 $\mu$m. Adjacent tracks 260 may be spaced at about 0.71 $\mu$m, with a separation of the order of 0.11 $\mu$m between magnetic regions of adjacent tracks.

During reading of information from the tracks 260 within the data wedges 266, the incident polarized laser beam 104 is directed towards the MSR storage media 106 with a different power than the power used during writing. This heats the illuminated region of the readout layer 252 and produces a temperature profile in the readout layer which is a function of the incident power. FIG. 5A illustrates a temperature profile 326 formed in the readout layer 252 below the optical laser beam spot 300. (Curves 304 and 326 illustrating the temperature profiles during writing and reading, respectively, are not to scale.) At a temperature greater than a predetermined readout temperature 328, the magnetic flux in the storage layer will be transferred to the readout layer. The region in the readout layer which exceeds the readout temperature will define an MSR "aperture" 330 which enables the magnetization in the magnetic region beneath the aperture to be read. The aperture will have a size that is a function of the incident light power in the read laser beam. Preferably, aperture 330 has a predetermined narrow size of the order of 0.4 $\mu$m diameter (i.e., read narrow) for reading successive magnetic regions 320 recorded as user readable data along tracks 260 in data wedges 266. However, as known, because the MSR media 106 rotates below the incident optical spot 300, the aperture 330 will actually assume a somewhat elongated shape as shown in dotted lines in FIG. 5B. The properties of the readout layer 252 are selected such that the magnetic dipoles formed within the aperture 330 become oriented in the same direction as that of the previously recorded magnetic domains 310 or 312 in the storage layer 254 beneath the aperture. The incident polarized laser beam 104 is directed through the polarization-maintaining optical fiber 120 with a predetermined incident polarization, and impinges upon the MSR media with this polarization. The incident laser beam is reflected from the readout layer 252 as the reflected laser beam 126, as previously described, with a different polarization. Due to the Kerr effect, depending upon the particular orientation of the magnetic dipoles within the aperture 330, the polarization of the reflected laser beam is rotated relative to the polarization of the incident laser beam. The change in polarization of the reflected laser beam relative to the incident laser beam represents the data recorded in the MSR storage media beneath the aperture.

For a given initial power setting of the laser beam, the temperature produced in the readout layer 252 as illustrated by temperature profile 326 of FIG. 5A may change with operating conditions and variations in parameters of the system, particularly the media 106. These include, for example, the speed of rotation of the media, changes in media temperature, variations in media sensitivity with radius, and changes in the recording and writing efficiency of head 110. Since variations in the temperature profile in the readout layer will affect the size of aperture 330, it is desirable to closely control temperature variations and the associated variations in aperture size. If the aperture formed is too small, either the entire or a portion of the magnetic region 320 may not be coupled through the aperture to the readout layer 252, thereby resulting in an inadequate signal for accurate detection of the polarization rotation of the reflected laser beam. Conversely, if the temperature in the readout layer is too great and the aperture is too large, the signal produced may be the result of adjacent magnetic regions in the storage layer 254 and be degraded because of intersymbol interference. For these reasons, it is desirable to monitor the operating conditions of the MO storage system and compensate for variations in parameters. Some changes result in short-term parameter variations, such as temperature, and must be monitored and compensated in real time. Other variations such as changes in head efficiency due to contamination and the like occur more slowly and can be compensated in other ways. The invention addresses both problems by providing a real-time media temperature tracking system that continuously monitors media temperature during operation in the vicinity of the locations being read, and compensates for variation by controlling the power in the laser beam to maintain a constant aperture size. The invention compensates for the longer term variations by changes in nominal operating parameters. The way in which the invention accomplishes these functions will be described shortly, but first it will aid in the understanding of the invention to describe in more detail the drive module 200 and servo module 210 of the MO system 100.

Figure 6:
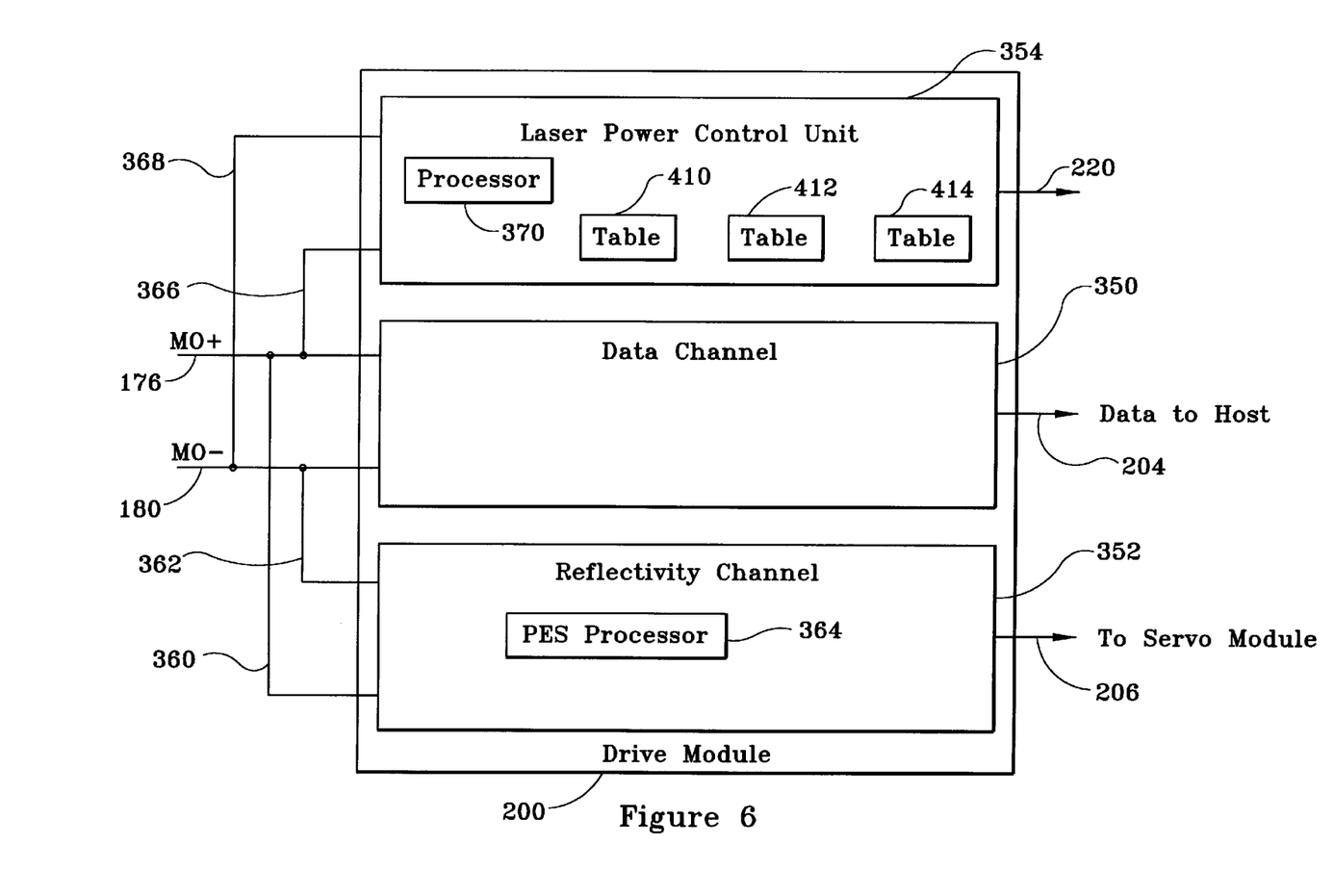
FIG. 6 is a block diagram of a drive module for controlling the system of FIG. 1.

FIG. 6 is a block diagram of a preferred embodiment of the drive module 200 of the MO storage system 100 of FIG. 1. As shown, the drive module may include a data channel unit 350, a reflectivity channel unit 352, and a laser power control unit 354. The drive module 200 receives the MO+ analog signal from representing the positively rotated component of the reflected light beam the laser optics assembly 102 via line 176. The drive module further receives the MO− analog signal representing the negatively rotated polarization component of the reflected light beam from the optics assembly via line 180. The MO+ and MO− signals are provided to the data channel unit 350, the reflectivity channel unit 352 and the laser power control unit 354, as indicated in FIG. 6. The data channel control unit 350 processes the MO+ and MO− signals in a manner well known to generate a binary "1" or "0" data signal on line 204 to the host CPU. The binary data signal produced by the data channel unit represents the information stored in the particular magnetic regions 320 of the storage layer 254 of the track of MSR media 106 which is being read by the laser beam. This information may represent data or represent control signals which are recorded on the media for control purposes as will be described shortly.

In some known MO storage systems, the MO head is controllably positioned over an MO media based upon the diffraction information in the laser beam reflected from grooves disposed between tracks on the media. The invention preferably employs a different approach. Because single-mode PM optical fibers 120 do not convey diffraction information accurately, diffraction information is not used by the invention to position the head 110 over the media 106. Rather, the invention controls the position of the head 110 over a particular data track 260 using position error signals (PES) derived from the servo timing marks for the particular track being read in the STM field 272 of the servo sectors 268. As previously noted, the servo information may comprise embossed pits in the STM fields, and the reflected laser beam from the pits includes a signal representative of the destructive interference that occurs when the laser beam is reflected from the pits. This destructive interference is embodied in the MO+ and MO− signals, and is conveyed to the reflectivity channel unit 352 of the drive module 200 via lines 360 and 362. The reflectivity channel unit includes a positive error signal (PES) processor 364 which processes the MO+ and MO− signals to provide PES signals to the servo module 210 via line 206. The servo module generates a servo control current proportional to the received PES, and provides the generated servo current control via line 212 to actuator 116 (see FIG. 1) to adjust the positioning of head 110. The actuator responds to the PES information to properly align the head relative to the track. This may be accomplished in a manner which is well known to those skilled in the art. In addition, the flying head itself may also include a fine tracking means (not shown), such as a dynamically controllable mirror, which may be used to deflect the laser beam to position the optical spot in response to the generated servo control current to afford fine adjustment for correcting radial position errors of the head.

The laser power control unit 354 of the drive module also receives the MO+ and MO− analog signals on lines 366 and 368, respectively. The laser power control unit processes the MO+ and MO− signals to provide a MO amplitude signal which is normalized to the laser power to produce a normalized MO amplitude signal which is used to generate a laser power feedback control signal which is supplied via line 220 to the laser optics assembly for controlling the power of diode laser 150. To generate the MO amplitude signal, the laser power control unit may include a processor 370 for processing the MO+ and MO− signals to generate the laser power control signal. The processor may sense the difference between the MO+ and MO− signals, full wave rectify the resulting different signal, and provide the MO amplitude as a signal proportional to the envelope of the rectified difference signal. The MO amplitude signal is normalized by dividing the MO amplitude by the corresponding laser powers. The laser power feedback signal may be derived as a signal proportional to the normalized MO amplitude signal. The laser power feedback signal may be used in ways that are well known to those skilled in the art to control the power output of the diode laser. The invention generates the laser power feedback signal such that the laser beam power is controlled so that the aperture 330 is maintained at a constant predetermined size, preferably at a nominal diameter of the order of 0.4 $\mu$m. The way that the invention accomplishes this will now be described.

Figure 7:
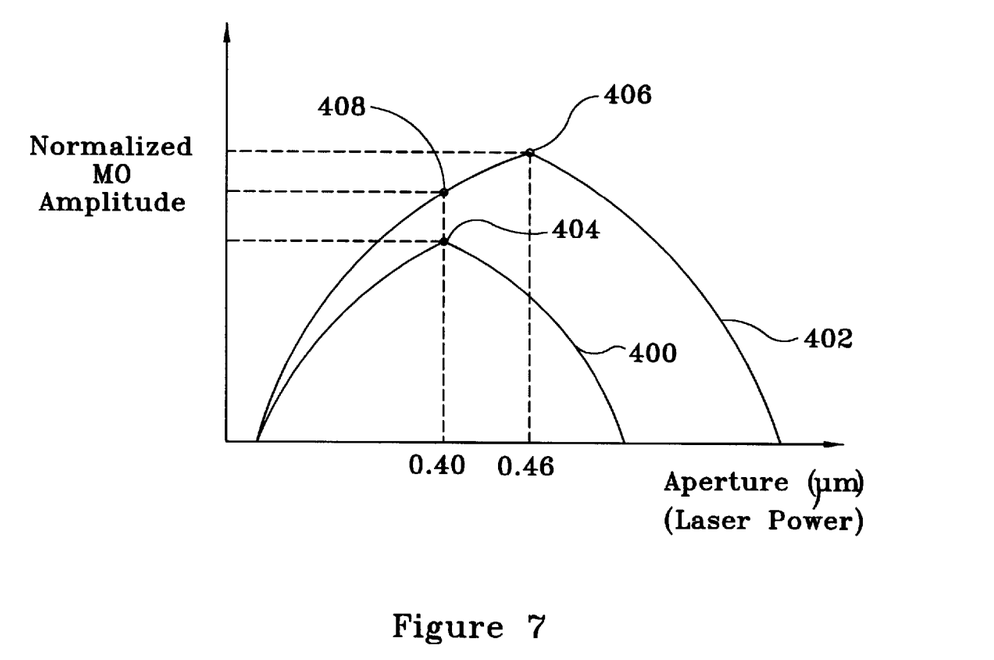
FIG. 7 is a diagram illustrating the variation in MO read signal amplitude of a reflected laser light beam as a function of aperture size and laser power for a first calibration tone and for second/third calibration tones recorded onto the MSR MO storage media.
Figure 8A:
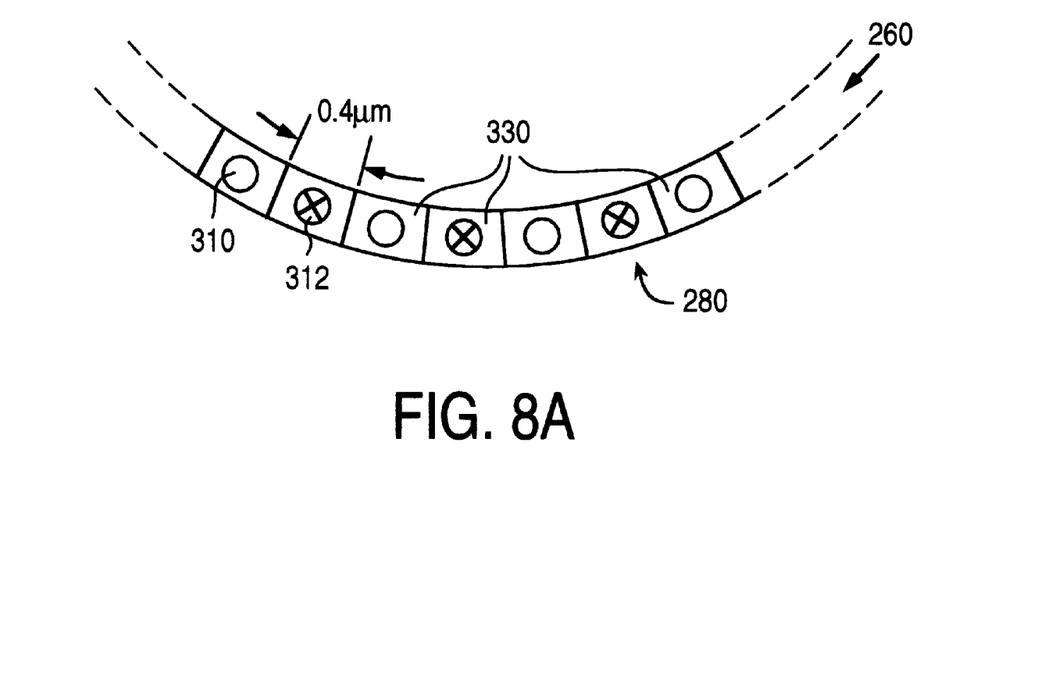
FIGS. 8A and 8B illustrate patterns of evenly spaced alternating magnetic regions of the MSR MO storage medium for, respectively, the first calibration tone and the second/third calibration tones.
Figure 8B:
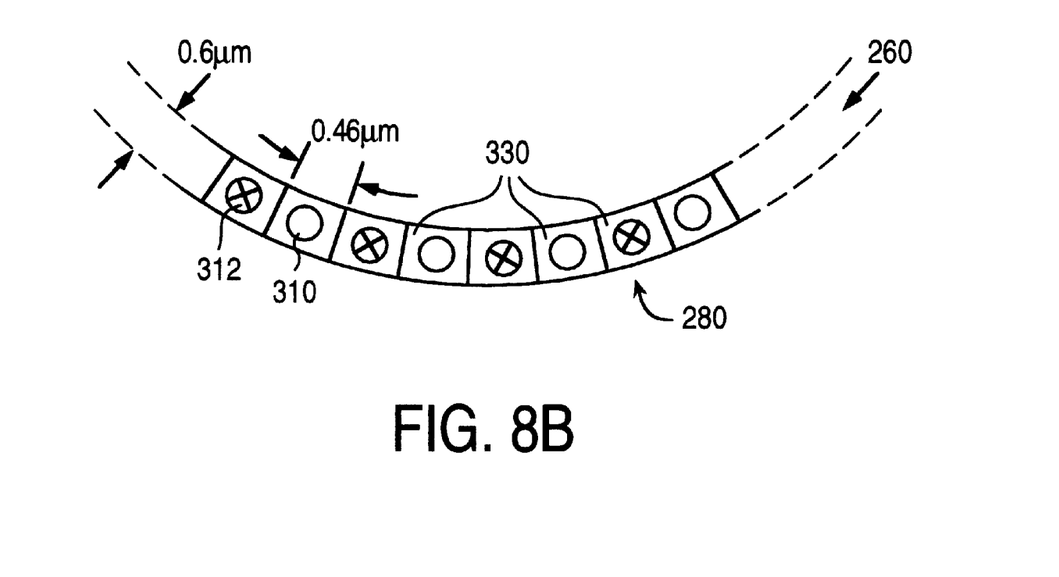

FIG. 7 presents two curves 400, 402 which show the variation in normalized MO amplitude and the size of the aperture 330 in the readout layer for evenly spaced alternating patterns of magnetic regions having given in track widths and corresponding to predetermined tones. Since the diameter of the aperture 330 will also vary with the power of the incident laser beam, the aperture sizes represented by the abscissa in FIG. 7 will correspond to particular incident laser beam powers. FIGS. 8A and 8B respectively illustrate the magnetic patterns for first and second/third calibration tones corresponding to curves 400 and 402 of FIG. 7. As indicated in FIG. 8A, a first calibration tone may be recorded in the VFO segment 280 of a track 260 with alternating magnetic regions 310, 312 and an in-track width of 0.4 μm. FIG. 8B illustrates a second/third tone recorded in the VFO segment 280 of track 260 having an in-track width of 0.46 μm. These tones may be prerecorded during an initial calibration phase to provide the alternating patterns of magnetic regions illustrated with the desired in-track widths illustrated in the figures.

The first calibration tone may be readout over a range of different power levels of the incident laser beam. For each power level, the corresponding MO amplitude signal in the reflected laser beam is measured by the laser power control unit 354 and normalized by dividing by the laser power level, as previously described. The resulting measurements may be converted to digital form and stored in a first calibration table 410 in the laser power control unit, and a curve may be fitted to the measurements to obtain the first tone curve 400 of FIG. 7. As shown, the curve will generally have a parabolic shape, with a peak normalized MO amplitude point 404. The MO amplitude signal in the reflected laser beam will depend upon the diameter of the aperture 330 formed in the readout layer 252 and will occur at an aperture size corresponding to the in-track width of the first tone magnetic regions. This is because an aperture diameter that is smaller than the particular magnetic regions 310, 312 will expose less of the entire magnetic region. This will result in a normalized MO amplitude corresponding to points on the curve 400 to the left of peak 404. Conversely, an aperture size larger than the entire magnetic region will expose more than one region and produce a normalized MO amplitude which is lower than the peak because of signal degradation due to intersymbol interference between adjacent magnetic domains. These normalized MO amplitudes are those to the right of peak 404 on curve 400. These measurements result in an initial calibration value and a starting point for setting laser power.

Subsequently, during use the power of the laser beam may be adjusted by the laser power control until the MO amplitude signal derived from the reflected laser beam corresponds to the peak normalized MO amplitude value 404 stored in the first calibration table 410. The invention identifies the particular power in the laserbeam that provides this normalized MO amplitude signal corresponding to peak 404 as that which will provide the desired predetermined aperture size of 0.41 μm. Once the power in the laser beam corresponding to peak 404 is found, the MO amplitude signal may be thereafter monitored by the laser power control unit for subsequent variations in MO signal amplitude. These variations are representative of variations in aperture size and deviations from the desired setting of 0.4 μm, and are caused by changes in operating conditions such as the operating temperature of the MSR media. The laser power control unit thus produces the laser power feedback signal on line 220 previously described to adjust the laser power to bring it back to the peak amplitude.

It will be recognized that since the optimum laser power corresponds to peak 404 which occurs along a portion of curve 400 that has a low dynamic range, i.e., the change in normalized MO amplitude with small deviations about the peak aperture size is small, relatively sensitive electronics are required to detect small changes in the normalized MO amplitude signal for small changes in aperture size. This renders the detection system sensitive to noise and other factors which make it difficult to accurately track changes. Moreover, since the same deviation and aperture size above and below the peak produces the same normalized MO amplitude value, there is an ambiguity as to the direction in which to vary the laser power to return to peak 404. Accordingly, it is desirable to provide a measurement characteristic that experiences a greater change in normalized MO amplitude value for a given change in aperture size, and which eliminates ambiguity in the direction in which laser power must be controlled. For example, it is desirable that normalized MO amplitude values above the value corresponding to the set point indicate a laser power that is too high, and that values below the set point value indicate a laser power that is too low. This condition is not satisfied with curve 400.

Accordingly, during the initial calibration phase, the invention writes a second pattern of magnetic regions 310, 312 into one of the VFO segments 280 of track 260, the magnetic regions corresponding to a second calibration tone illustrated in FIG. 8B. The spatial frequency of the second calibration tone is preferably lower than the spatial frequency of the first calibration tone. Since the shape of the curve depicting the relationship between normalized MO amplitude and aperture size for a particular tone depends upon the spatial frequency of the tone, the second calibration tone will have a different peak 406 corresponding to a wider aperture size determined by the in-track width of the second calibration tone, e.g., 0.46 μm, and which corresponds to a greater power in the incident laser beam.

The VFO segment 280 of a track is used by the data channel 350 to phase lock a variable frequency oscillator (VFO) to the frequency of the recorded tone. In the invention, the data channel may comprise a known PR4-type data channel, which uses VFO segments that typically comprise an alternating pattern of evenly spaced marks. The invention preferably employs an alternating pattern of marks having in-track width of 0.46 μm as previously described, and this tone recorded in a VFO segment 280 is used as the second calibration tone. Preferably, the second calibration tone is read during an initial calibration phase, and the resulting normalized MO amplitude signal vs. incident laser beam power measurements are stored in a second calibration table 412 in the laser power control unit 354. The curve 402, which also has a parabolic shape, is fitted to the measurements to determine the laser power and normalized MO amplitude at the peak 406 for the aperture size of 0.46 μm. The larger magnetic domain in-track width corresponding to the second calibration tone will generate a larger normalized MO amplitude signal when read by a larger aperture. Thus, the normalized MO amplitude corresponding to peak 406 will be greater than that corresponding to peak 404 for the first calibration tone, and will be displaced in aperture size from that of the first calibration tone to correspond with the intrack width of the second calibration tone, i.e., corresponding to an aperture size of 0.46 μm. This is illustrated in FIG. 7 which shows peak 406 of the second calibration tone represented by curve 402 displaced from peak 404 of curve 400 corresponding to the first calibration tone. Moreover, since laser power is related to aperture size, peaks 404 and 406 correspond to different laser powers. It may be seen that for the second calibration tone, the normalized MO amplitude 408 corresponding the selected aperture size of 0.4 μm (and corresponding to peak 404 the first tone), occurs on a downwardly sloping portion of curve 402 to the left of peak 406. Also, the region around point 408 exhibits a substantially greater change in normalized MO amplitude for a given change in aperture size and laser power than that associated with peak 404 of the first tone, and satisfies the desired criteria of having a lower normalized MO amplitude at aperture sizes corresponding to lower laser powers and a higher normalized MO amplitude for laser powers corresponding to higher aperture sizes. Thus, the second calibration tone and point 408 is used by the invention as the set point for the real-time control of the power of the incident laser beam. Thus, measured normalized MO amplitude values greater than point 408 correspond to wider than optimal aperture widths, and greater than optimal laser powers, while normalized MO amplitude values below point 408 indicate a narrower than optimal aperture width and a lower laser power than optimal. During operation, the normalized MO amplitude signal is derived from the second calibration tone and is used by the laser power control unit for the real-time control of incident laser power and, accordingly, for the real-time control of the read aperture size. As noted earlier, since the read aperture size is a fliction of the media temperature, which in turn is influenced by variations in operating parameters, this enables the real-time monitoring of media temperature and the corresponding real-time control of laser power to compensate for variations from the optimal set point to maintain a desired aperture size.

The power of the laser beam during writing is also preferably controlled to avoid variations in the write operation to afford a write-wide characteristic, since the magnetic regions in storage layer 254 should be wide enough so that each magnetic region can still be read if the laser beam is focused slightly off-track. Additionally, during writing, the power of the laser beam should be controlled so that adjacent magnetic regions are not inadvertently overwritten. Since the invention monitors media temperature during reading, it enables write power of the laser beam to be controlled to maintain an optimum size for aperture 330. Both the read and write power levels will change by a similar amount for changes in operating conditions and properties of the media 106, for example, temperature changes in the readout layer 252. Thus, write power levels can be determined based upon the read power levels. If a new laser read power level (RP) is determined as described above, the laser write power at the time of an initial power calibration (WPO) may be scaled by the ratio of the new laser read power (RP) divided by the laser read power at the time of calibration (RPO) to determine a new write power. The new laser write power (WP) can be obtained from the relationship WP=WPO (RP/RPO). The preceding description referenced particular sizes for in-track and cross-track widths of the magnetic region 320. It will be appreciated, however, that other dimensions may be used and that the system may be calibrated for the different values.

The invention may be used with a decision feedback (DFE) type data channel VFO segment 280. However, DFE data channel VFO segments typically include a pattern of non-evenly spaced regions. Such non-evenly spaced magnetic regions would make it difficult to obtain an MO amplitude signal vs. aperture diameter calibration curve such as 402 as previously described and illustrated in FIG. 7. Thus, with a DFE data channel, the invention preferably writes a third set of alternating evenly spaced up-down magnetic regions corresponding a third calibration tone in the data tracks 260. During initial calibration, the magnetic regions 320 which comprise in this third calibration tone are written with the same predetermined in-track width, e.g., 0.6 $\mu$m, as previously described for the second calibration tone. The third calibration tone may be used to provide a curve similar to curve 402, and a third calibration table 414 may be included in the laser power control unit for storing normalized MO amplitude, laser power and aperture size values. It may be used to control the diameter of the aperture 330 formed in the readout layer during reading by the laser beam in the same manner as previously described. However, in the second embodiment, the data wedges 266 will have a somewhat reduced storage capacity, since the third calibration tone will require a finite amount of each data track 260 within each data wedge 266 beyond that already employed by the DFE data channel VFO segment 280.

The invention may use well known techniques for writing data such as constant angular velocity (CAV) or constant linear velocity (CLV) techniques. With CAV, each of the data wedges 266 (FIG. 3) may be divided to include a plurality of circumferentially extending zones 420 having a predetermined radial width. Preferably, the invention employs CAV techniques, and the first calibration tone is prewritten into each zone 420 along an entire inner most or outer most data track 260 within that zone, excluding the VFO segment 280 spanning each zone. Preferably, each VFO segment 280 is prewritten to provide the second calibration tone, and the VFO segment is present at the start of each data track 260 that spans each zone 420. Alternatively, the first calibration tone may be written along other than either the inner most or outer most data tracks, as well as only along a portion of an inner most or an outer most data track spanning each zone.

The invention may also use CLV techniques. When CLV techniques are used, the first calibration tone may be prewritten along the entire inner most or outer most data track 260 (excluding the VFO segment 280) spanning each data wedge 266. The second calibration tone may be prewritten into each VFO segment 280, and each VFO segment may be located at the start of each data track 260 that spans each data wedge 266. Alternatively, the second calibration tone may be written along other than the inner most or outer most data track, or only along a portion of an inner most or outer most data track spanning each data wedge 266.

Where a DFE type data VFO segment is used, the first calibration tone may be prewritten using either CAV or CLV techniques as described above. In such cases, the third calibration tone may be prewritten outside the VFO segment 280 of each data track 260 that spans each zone 420 or data wedge 266 (excluding the tracks where the first calibration tone is prewritten along an inner most or outer most data track). Preferably, the third calibration tone spans approximately forty bytes, but may span greater or fewer than forty bytes if desired.

The disposition of the first and either the second or third calibration tones permits calibration curves such as illustrated in FIG. 7 to be derived for different portions of the MSR media 106, e.g., wedges, zones and tracks. Thus, depending on the characteristics of the MSR media, different set points for laser beam power can be determined and stored in tables in the laser power control unit and used for controlling the laser beam when it is reading or writing in the different portions of the media in order to maintain the preferred aperture size over each region. As will be apparent from the foregoing, the locations of the first and the second or third calibration tones on the data tracks of the MSR media may be at other than the locations described.

In operation, a first pattern of magnetic regions 320 comprising a first spatial frequency, i.e., the first calibration tone, is prewritten unto the MSR media 106. The laser beam 104 is directed toward the first calibration tone, and a normalized MO amplitude signal derived from the reflected beam and the first calibration tone is determined. The power of the laser beam is varied, the normalized MO amplitude signal is measured at a plurality of points, and the calibration curve of 400 defining the relationship between the power of the laser beam and the normalized MO amplitude is determined. Preferably, one power corresponds directly to the peak 404 and the normalized MO amplitude signal. This peak amplitude value may be stored as the first peak 404 in the first calibration table 410. Then, during subsequent use, differences between the measured normalized MO amplitude signal and the first peak value 404 may be monitored, and the power of the laser beam adjusted to compensated for variations so as to maintain the normalized MO amplitude signal at the first peak value 404. The normalized MO amplitude signal at the first peak will preferably correspond to an aperture in the MSR media 106 that has the preferred diameter, irrespective of variations in the parameters of the MSR media.

Next, a second pattern of magnetic regions 320 comprising the second spatial frequency, i.e., the second calibration tone, may be prewritten onto the MSR media along data tracks 260 other than the data tracks on which the first calibration tone is prewritten. The power of the laser beam is again varied, corresponding MO amplitude signals measured, the normalized values are stored in the second calibration table 412, and the second curve 402 defining the relationship between the laser beam power and the normalized MO amplitude for the second calibration tone determined. Preferably, the laser beam power corresponding to the first peak value 404 of the first calibration tone, and corresponding to value 408 on the second curve, is determined and stored in the table. During subsequent operation, differences between the normalized MO amplitude signal and the value 408 for the second calibration tone may be monitored in real-time and used to derive the laser power control feedback signal to adjust the power of the laser beam to maintain the normalized MO amplitude signal at the second value 408. This value also preferably corresponds to the preferred diameter of aperture 330 in the MSR media and is used to control aperture size irrespective of the variations in the characteristics, such as temperature, of the media.

Thus, by continually monitoring in real-time the MO amplitude values derived from the reflected laser beam, comparing the normalized values to the calibration curve for the tone being read, and using the deviations from a predetermined value to control the laser power, the invention enables the temperature and other characteristics of the media to be monitored continuously in real-time, and the laser power adjusted accordingly to maintain a constant aperture size.

In addition to monitoring in real-time media characteristics such as temperature, the invention also enables monitoring and correction of variations in media characteristics which occur at a more gradual rate. These include, for example, changes in reflectivity of the media due to contamination which effect head efficiency. Reflectivity signal changes due to contamination typically occur very slowly, and this factor may be measured periodically, e.g., monthly, to generate a contamination correction factor which may be used to modify the values stored in the calibration tables.

Furthermore, it should be recognized that since the MSR recording method is a write-wide, read-narrow method, it is possible to use the data in the data cells directly to measure the MO signal amplitude, rather than employing a special amplitude calibration pattern. Also, it should be observed that the set point for the laser power is the measured MO amplitude that maximizes the signal. Periodic calibration may be performed to insure that the set point actually corresponds to the optimal amplitude and aperture size, and appropriate correction factors stored to modify the table values.

While the foregoing has been with reference to particular embodiments of the invention, it will be appreciated by those skilled in the art that changes may be made and these embodiments without the departing from the principles and the spirit of the invention, the scope of which is defined in the appended claims.

What is claimed is:

1. A method of controlling laser power in a magneto-optical storage system having a rotating magneto-optical medium onto which information is written and read using the laser, the method comprising directing laser light onto a pattern on the magneto-optical medium;

receiving laser light reflected from the medium;

generating from the received light a signal representative of a characteristic of the reflected light;

controlling the power of the laser to cause the signal to assume a predetermined value, wherein the pattern comprises a pattern of alternating evenly spaced magnetizations defining a tone having a predetermined frequency, wherein the magnetizations have a predetermined in-track spacing, wherein the signal representative of a characteristic of the reflective light comprises a signal corresponding to an amplitude of detected polarization values in the reflected light, wherein the amplitude of the signal corresponds to the temperature of the magneto-optical medium, wherein the controlling the power comprises controlling the power of the laser to provide a predetermined temperature, wherein the temperature of the medium is related to the size of a read aperture in the medium, wherein the controlling the power comprises controlling read aperture size, wherein the controlling the power comprises controlling the power of the laser to provide a read aperture size which is less than the spacing between adjacent magnetic regions in the magneto-optical medium containing the pattern, and wherein the patterns comprise prerecorded tones of different spatial frequency;

measuring the amplitude of the received light signals for a plurality of different laser powers;

defining a functional relationship between amplitude and laser power from the measured values; and controlling the power of the laser using the functional relationship to provide a predetermined aperture size.

* * * * *